United States Patent [19]
Baals et al.

[11] Patent Number: 5,371,788
[45] Date of Patent: Dec. 6, 1994

[54] ARRANGEMENT FOR DISPLAYING MENU SCREENS ON A TELEPHONE TERMINAL

[75] Inventors: Kimberly A. Baals, Matawan; Kathleen J. Chylinski, Bridgewater; Darren A. Kall, Highland Park; Gary C. Smith, Freehold; Susan L. Tuttle, East Windsor, all of N.J.

[73] Assignee: AT&T Corp., Murray Hill, N.J.

[21] Appl. No.: 46,242

[22] Filed: Apr. 13, 1993

[51] Int. Cl.⁵ .............................. H04M 9/00
[52] U.S. Cl. ......................... 379/396; 379/94; 379/96; 379/201; 379/93; 395/156
[58] Field of Search ............. 379/396, 94, 96, 201, 379/93; 395/156

[56] References Cited

U.S. PATENT DOCUMENTS 4,897,866  1/1990  Majmudar et al. ............ 379/94
5,261,042  11/1993 Brandt ............................ 395/156

Primary Examiner—James L. Dwyer
Assistant Examiner—Jacques M. Saint-Surin
Attorney, Agent, or Firm—Samuel R. Williamson

[57] ABSTRACT

An interactive display arrangement in a telephone terminal permits direct movement between unrelated child menu screens in a menu hierarchy. The arrangement is configured such that a user may advance directly from a displayed first child menu screen to an unrelated second child menu screen in the menu hierarchy, in order to perform specific tasks at the second child menu screen. Once the tasks at the second menu screen are completed or the user elects not to perform such tasks, the arrangement permits the user to return directly to the first child menu screen. The user of the telephone terminal thus is able to easily complete specific tasks at selected menu screens in the interactive display arrangement without the need for excessive movement in the menu hierarchy.

22 Claims, 4 Drawing Sheets

ARRANGEMENT FOR DISPLAYING MENU SCREENS ON A TELEPHONE TERMINAL

BACKGROUND OF THE INVENTION

1. Technical Field

This invention is directed to telephone terminals and more particularly, a telephone terminal configurable by a user for accessing features available on the terminal through an interactive display arrangement.

2. Description of the Prior Art

Current trends in the design of telephone terminals indicate that more and more telephone functionality is being integrated into the telephone display. For example, information as to the features available on the display has migrated from LEDs to the display, and local additions such as directories, status inspection, incoming caller information etc., are all migrating to the display.

Many interactive display arrangements in the art today permit accessing available features on the display through softkeys, and performing tasks associated with these features. In order to assist a user of the telephone terminal in accessing the many available features, many softkey label screen prompts have heretofore been provided as guides for moving about in the hierarchy of menu screens. Although these screen prompts do improve somewhat the ease with which one uses the display, the basic requirement of having to move more than a few screens in the menu hierarchy to access different features often tends to be confusing and is considered undesirable for many users of the telephone terminal.

The display arrangements available in the art today follow a strict logical model, which is to move down in the menu hierarchy only from a "parent" screen to a "child" screen and to move up in the menu hierarchy from a child screen only to a parent screen. Thus when a user completes a task defined in a child screen at a particular level, the available arrangements only permit moving back from this child screen to a parent screen at the next higher level in the menu hierarchy. As the user thus moves through the menu hierarchy, or after completing tasks at child screens in the menu hierarchy, the user is taken logically back to the beginning of the softkey menu or even forced to exit out of the softkey menu mode completely. It is desirable, therefore, to have an interactive display arrangement without the indicated disadvantages.

SUMMARY OF THE INVENTION

The prior art problems are solved in accordance with the present invention through use of an interactive display arrangement wherein direct movement between unrelated child menu screens in a menu hierarchy is provided.

The telephone terminal provides a plurality of screens of information messages arranged within a menu hierarchy as multiple parent and child level information messages for displaying in respectively associated parent and child menu screens. In preferred embodiments, the interactive display arrangement is configured so that a user may advance directly from a displayed first child menu screen to an unrelated second child menu screen in the menu hierarchy, in order to perform specific tasks at the second child menu screen. Once the tasks at the second menu screen are completed or the user elects not to perform such tasks, the arrangement returns the user directly to the first child menu screen. With this arrangement, the user of the terminal is able to complete easily specific tasks at selected menu screens without having to move about excessively in the menu hierarchy.

BRIEF DESCRIPTION OF THE DRAWINGS

This invention and its mode of operation will be more clearly understood from the Following detailed description when read with the appended drawing in which.

Throughout the drawing, the same elements when shown in more than one figure are designated by the same reference numerals.

DETAILED DESCRIPTION

Figure 1:
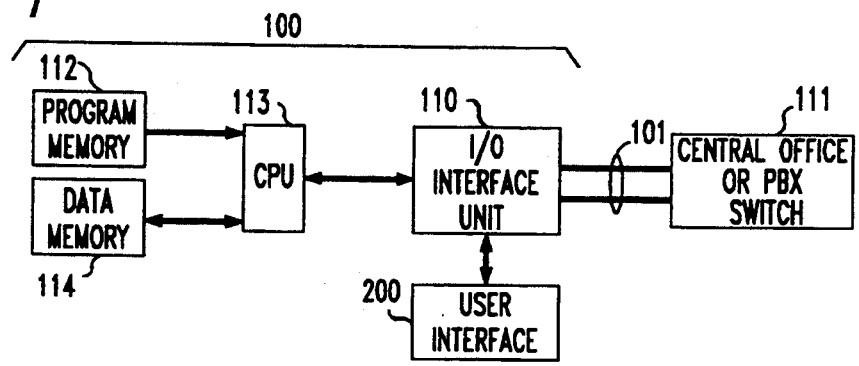
FIG. 1 is a block diagram of a telephone terminal usable for incorporating the present invention.

Referring now to FIG. 1, there is shown an illustrative block diagram of a telephone terminal 100 useful for describing the operation of the present invention. The terminal includes an input/output (I/O) interface unit 110 which connects to a telecommunication switch 111, such as the 5ESS® central office (CO) switch or the DEFINITY® private branch exchange (PBX) switch, via lines 101. This I/O interface unit 110 contains switching, control, and line circuits required by the terminal 100 for establishing, maintaining and terminating communication connections between the terminal and the CO or PBX switch 111. Through these circuits, the terminal 100 thus sends to and receives from the CO or PBX switch 111 switching and control signals.

The terminal also includes a program memory 112 which provides instructions to a central processor unit (CPU) 113 for controlling the various operating features and functions originating at the terminal. This program memory 112 also contains data for interpreting a plurality of codes representative of various network information received from the switch 111 and for generating codes to be transmitted to the switch 111. A data memory 114 is utilized by the CPU 113 for storing and accessing data associated with performing the various functions and features programmed in the progrant memory 112. In one embodiment, CPU 113 is a microprocessor, program memory 112 is read-only-memory (ROM) and data memory 114 is a random-access-memory (RAM). These components are readily available from a number of semiconductor manufacturers such as Intel, Motorola, AMD and NEC. Connected to the interface unit 110 is a user interface 200, the physical aspects of which are shown in greater detail in FIG. 2.

Figure 2:
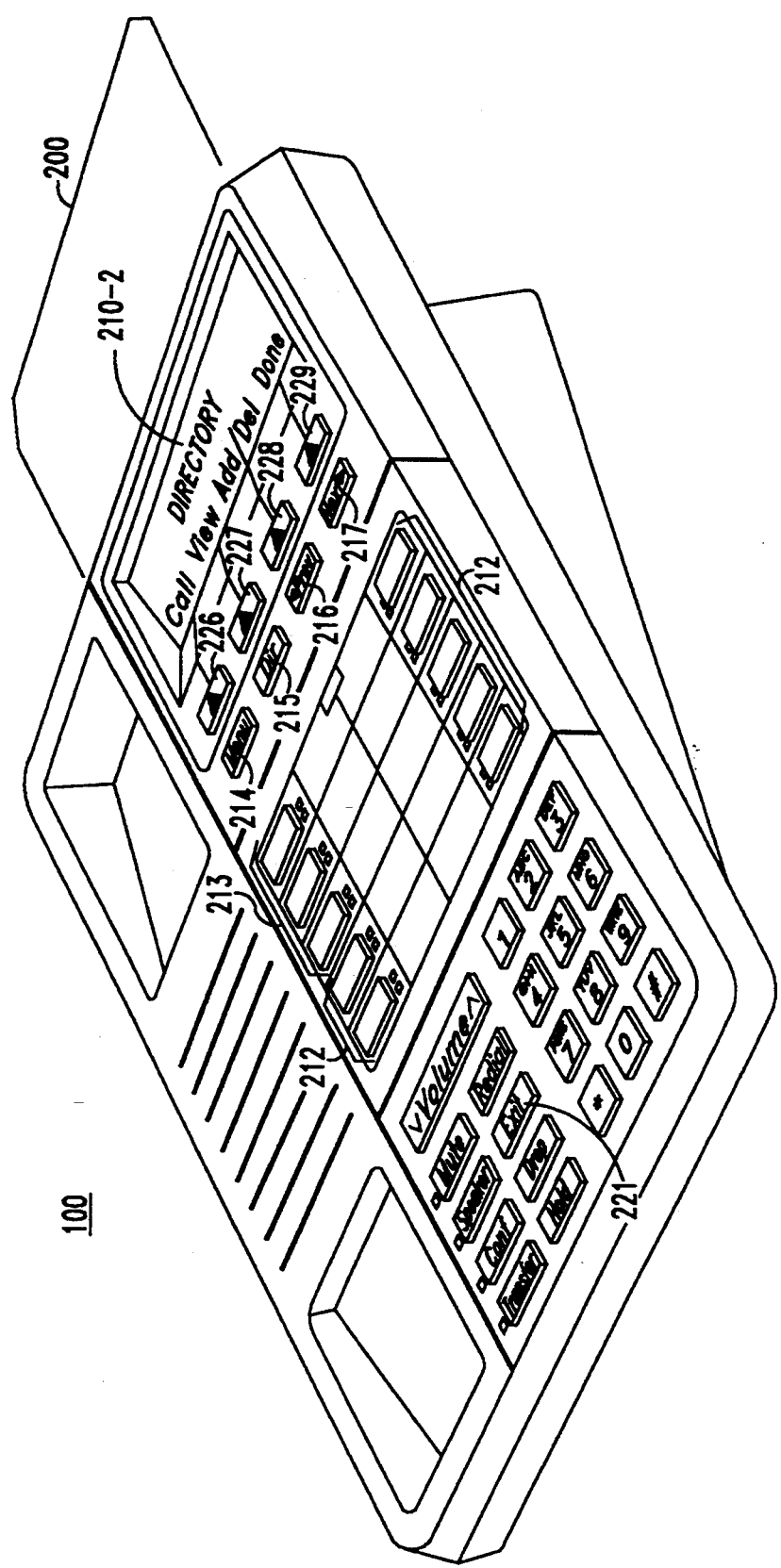
FIG. 2 illustrates the telephone terminal of FIG. 1 including a user interactive display displaying a first menu screen.
Figure 5:
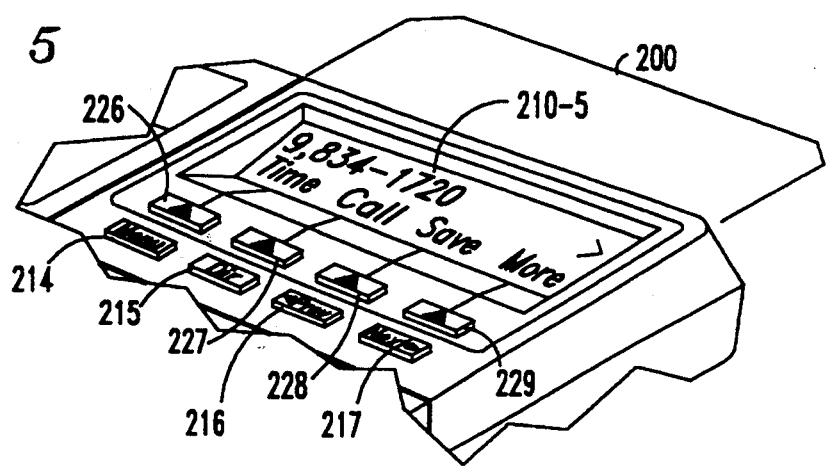
FIG. 5 illustrates the telephone terminal of FIG. 1 including a user interactive display displaying a third menu screen, accessible in accordance with the present invention.
Figure 6:
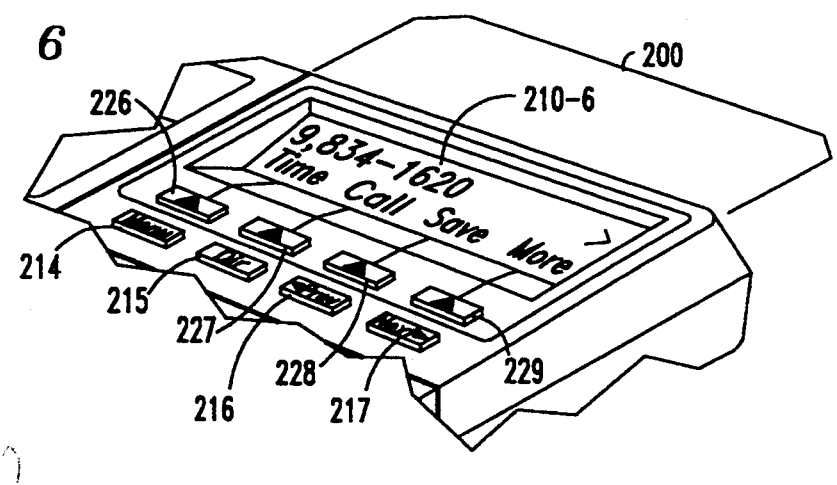
FIG. 6 illustrates the telephone terminal of FIG. 1 including a user interactive display displaying a fourth menu screen, accessible in accordance with the present invention.
Figure 7:
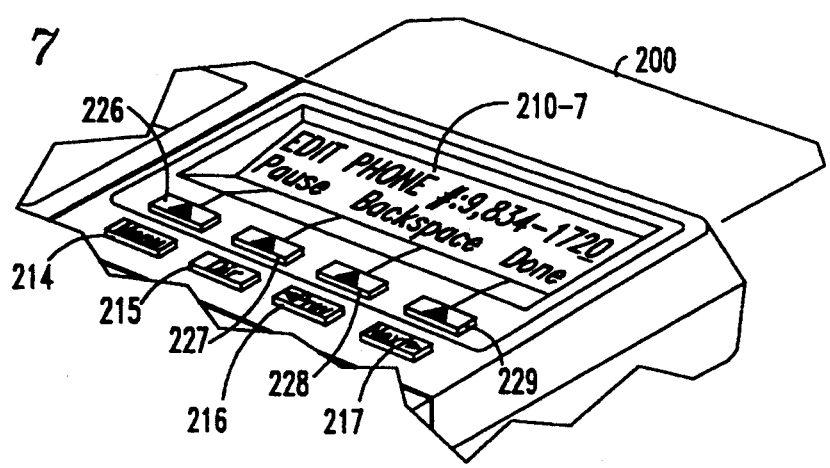
FIG. 7 illustrates the telephone terminal of FIG. 1 including a user interactive display displaying a fifth menu screen, accessible in accordance with the present invention.
Figure 8:
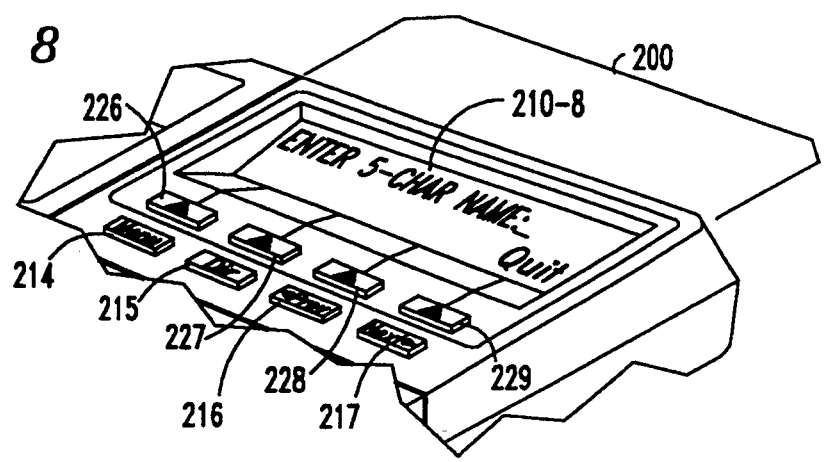
FIG. 8 illustrates the telephone terminal of FIG. 1 including a user interactive display displaying a sixth menu screen, accessible in accordance with the present invention.
Figure 9:
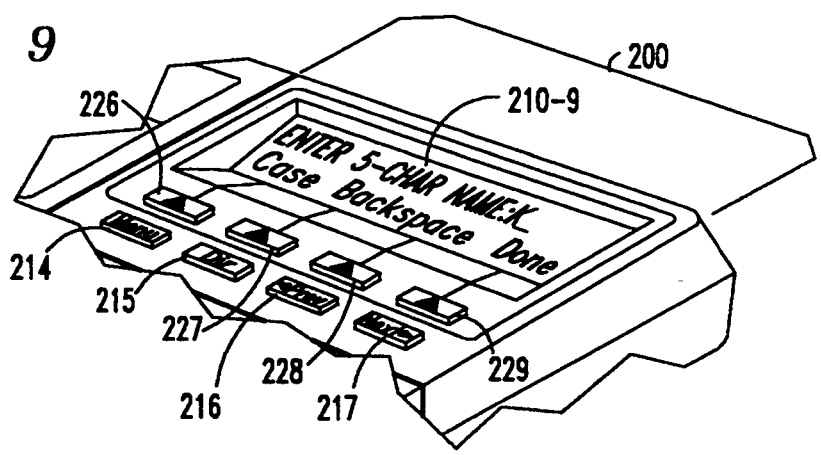
FIG. 9 illustrates the telephone terminal of FIG. 1 including a user interactive display displaying a seventh menu screen, accessible in accordance with the present invention.
Figure 10:
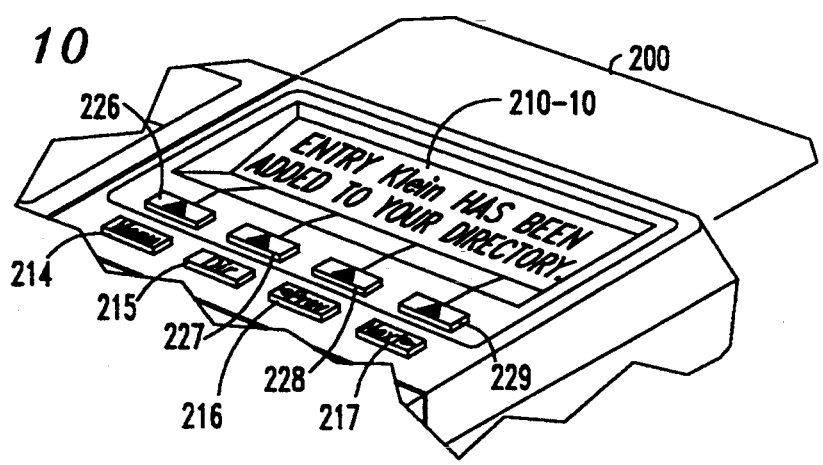
FIG. 10 illustrates the telephone terminal of FIG. 1 including a user interactive display displaying an eighth menu screen, accessible in accordance with the present invention.

With reference now to FIG. 2, the user interface 200 comprises a user interactive display 210-2, switch administered keys or buttons 212, call appearance keys or buttons 213, multiple hard keys 214 through 217, an "Exit" key 221 and softkeys 226 through 229. Other well-known keys or buttons are also illustrated as part of the telephone terminal shown in FIG. 2 but are not further described herein.

The multiple hard buttons 214 through 2 17 are respectively labeled "Menu", "Dir", "<Prev>", and "<Next>". The Menu button 214 is used to configure the terminal to the local softkey state, one aspect of which is described in greater detail later herein with reference to FIGS. 4 through 10. Similarly, the Dir button 215 also configures the terminal to the local softkey state, and also gives the user quick access to a local directory stored in the terminal with the first few entries appearing on the display. The <Prev and Next> buttons 216 and 217 are used to access additional menu items in both the local softkey state and in a network-based or switch feature state. In the local softkey state, for example, names and telephone numbers may be accessed by these buttons for entering or editing with the softkeys 226 through 229, as further described later herein. Also the <Prev and Next> buttons 216 and 217 may be used in the switch feature state, for example, to display the previous or next entry in a directory query feature.

The labels and functions of the softkeys 226 through 229 appear on the associated display 210-2. The label or function for each of these keys changes dynamically as the user performs functions and makes selections via these softkeys. Shown in the display 210-2 is just one menu screen in the hierarchically arranged menu. The illustrated entry is that of a personal DIRECTORY which typically may support up to 30 directory entries. These entries may be added, edited or deleted. The screen (not shown) for performing these tasks is selected by depressing the softkey 228. After any desired editing is completed, the terminal is informed of such completion by the user depressing the softkey 229.

While the embodiment of the present invention is described as being incorporated into a telephone terminal, it should be recognized that the present command-operated terminal could be utilized in other program-controlled systems. Since such systems utilize a variety of hardware and programming techniques, no attempt is made to describe the details of the program used to control the telephone terminal. However, the present invention must be blended into the overall structure of the system in which it is used and must be tailored to mesh with other features and operations of the system. Thus, in order to avoid confusion and in order to enable those skilled in the art to practice the claimed invention, this specification will describe the operation of the present invention using the telephone terminal 100 shown in both FIGS. 1 and 2 together with the state diagram of FIG. 3 and the menu screens 210-2 and 210-4 through 210-10 of FIGS. 2 and 4 through 10, respectively, which taken together describe the logical steps and the various parameters required to implement the present invention.

Figure 3:
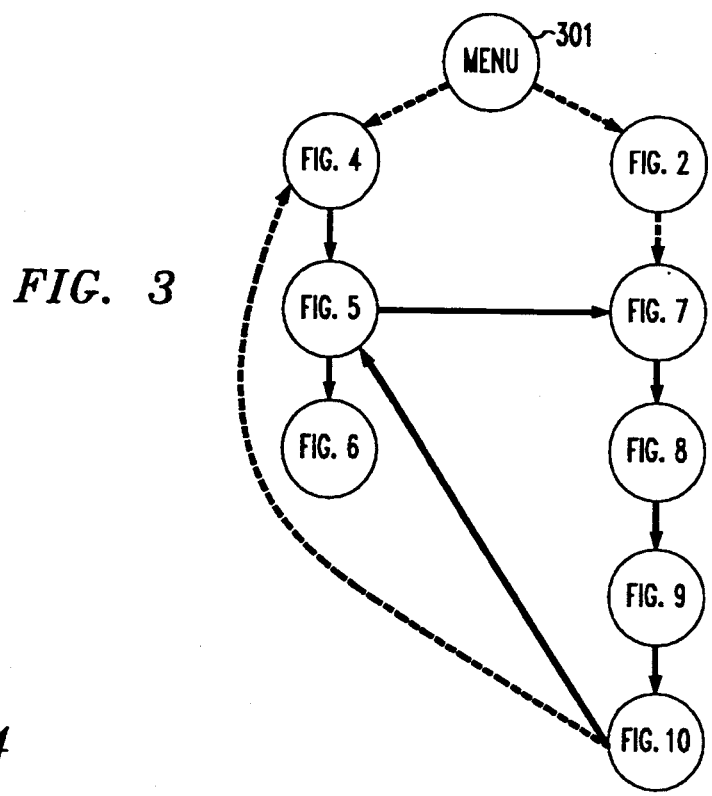
FIG. 3 is a state diagram showing one possible movement path between the menu screens illustrated in FIGS. 2 and 5 through 10, in accordance with the present invention.
Figure 4:
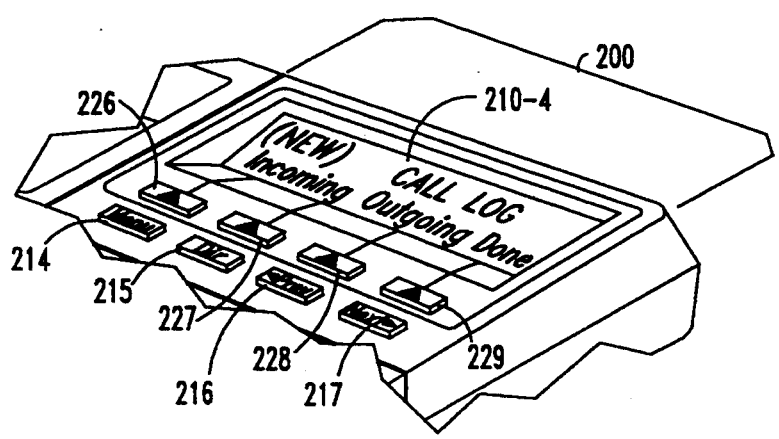
FIG. 4 illustrates the telephone terminal of FIG. 1 including a user interactive display displaying a second menu screen, accessible in accordance with the present invention.

The interactive display arrangement facilitates ease of movement between menu screens in a display device at a telephone terminal, in accordance with the invention. In this regard and with reference next to FIG. 3, there is shown a state diagram illustrating a possible movement path between the menu screens shown in FIGS. 2 and 4 through 10. This state diagram provides a typical movement path for a user of the telephone terminal to view an outgoing call log number stored in the call log branch of the menu hierarchy and then save the number in the directory branch of the menu hierarchy. Although displays 210-2 and 210-4 shown in FIG. 3 are illustrated as extending from a common menu screen 301, it is to be understood that these interconnections are merely illustrative. Other display screen may be juxtaposed between either or both of these menu screen and the menu screen 301. Also these screens 210-2 and 210-4 need not both be at the same level in the menu hierarchy for practicing the principles of the invention.

In an illustration of the functionality of the telephone terminal in permitting direct movement between unrelated child menu screens in the menu hierarchy, the following operative description, in accordance with the invention, is provided.

In this regard and with specific reference to the state diagram of FIG. 3 and the menu screens 210-4 through 210-10 of FIGS. 4 through 10 respectively, the interactive display arrangement is configured such that a user may advance directly from a displayed first child menu screen to an unrelated second child menu screen in the menu hierarchy. This action generally is desired by the user in order to be able to perform specific tasks at the second child menu screen. Once the tasks at the second menu screen are completed or the user elects not to perform such tasks, the arrangement permits the user to return directly to the first child menu screen or, as more appropriate after the completion of some tasks, to the parent of the first child menu screen. The user of the telephone terminal thus is able to complete easily specific tasks at selected menu screens in the interactive display arrangement without the need for excess movement in the menu hierarchy.

By way of operative example, if a user of the telephone terminal 100 while at the call log display 210-4 decides to view the outgoing call log, the user presses the softkey 228. The outgoing call log stores, for example, the 10 most recent calls that were placed, or at least attempted, at the telephone terminal. After pressing the softkey 228, the user is presented with call log information such as that illustratively shown in the display 210-5. This call log information is for the number of a call recently dialed at the telephone terminal. The user at this point in the call log branch of the menu hierarchy may decide to, for example, either call the displayed number or move to a sibling child screen such as that shown in the display 210-6. The user calls the displayed number by pressing the softkey 227. The user displays the next called number by pressing the softkey 229 or the Next> hardkey 217.

The user also has the option, in accordance with the invention, while on display 210-5 to save directly the outgoing call log number into the directory. If the user does decide to save this number into the directory at the telephone terminal, he or she achieves this by presses the softkey 228. Pressing this softkey advances the telephone from the display 210-5, which represents a first child screen in the menu hierarchy, to the display 210-7, which represents a second child screen in the menu hierarchy. Thus, rather than continuing with a task in the call log branch of the menu hierarchy, by this simple action, the user has temporarily accessed a child screen in the directory branch of the menu hierarchy which prompts the user on how to save the call log number.

The call log number is automatically entered into a data entry menu screen such as that shown in display 210-7 where the user may edit the number if desired. The user next advances through the sibling child screens necessary to save the call log number into the directory with a name, this task being requested in display 210-8 and begun in display 210-9.

Once a name has been entered and the user accordingly so indicates, a confirmation screen such as shown in display 210-10 is presented to the user. If the name is correct and the user indicates such, the user is then returned to the call log information screen presented in display 210-5, from which the save process was initiated. The user may then exercise any of the other optional tasks again presented in display 210-5 such as, for example, continuing with the original process of viewing the other entries in his or her call log. After completing tasks in certain unrelated child menus, it may be more appropriate to return the user to the parent of the first child menu screen. The user may then exercise the optional tasks presented at this parent screen.

In the described process, the user's logical path is tracked in the parent-child context. The process remembers in which branch of the menu hierarchy and in which tasks the user was active before moving to a new branch and starting new tasks. When appropriate, therefore, the process returns the user to either the tasks presented at the child screen at which the user was active before moving to the new branch, or the tasks available at the parent screen of this child screen.

What has been described is merely illustrative of the present invention. Other applications to telephone, computer or other user interactive systems other than the disclosed system are contemplated as being within the knowledge of one skilled in the art and may be utilized without departing from the spirit and scope of the present invention.

We claim:

1. An arrangement for displaying screens of information messages in a display device at a telephone terminal, the arrangement comprising:

means for generating a plurality of screens of information messages arranged within a menu hierarchy, the information messages including multiple parent level and multiple child level information messages for displaying in associated parent and child menu screens;

means for advancing directly over a predetermined path from a displayed first child menu screen to an unrelated second child menu screen in the menu hierarchy for performing specific tasks at the second child menu screen; and means for displaying in the unrelated second child menu screen an information message, said information message including information provided by said first child menu screen for performing said specific tasks.

2. The arrangement of claim 1 wherein the second child menu screen is located at the same level in the menu hierarchy as the first child menu screen.

3. The arrangement of claim 1 wherein the second child menu screen is located at a level in the menu hierarchy lower than the first child menu screen.

4. The arrangement of claim 1 wherein the second child menu screen is located at a level in the menu hierarchy higher than the first child menu screen.

5. The arrangement of claim 1 further comprising means for returning directly from the second child menu screen to the first child menu screen upon completion of the specific tasks performed at the second child menu screen.

6. The arrangement of claim 1 further comprising means for returning directly from the second child menu screen to a parent of the first child menu screen upon completion of the specific tasks performed at the second child menu screen.

7. The arrangement of claim 5 wherein the second child menu screen is located at the same level in the menu hierarchy as the first child menu screen.

8. The arrangement of claim 7 wherein the second child menu screen is located at a level in the menu hierarchy lower than the first child menu screen.

9. The arrangement of claim 8 wherein the second child menu screen is located at a level in the menu hierarchy higher than the first child menu screen.

10. The arrangement of claim 5 wherein the information messages being displayed in parent and child menu screens define the specific tasks that are performed at said menu screens.

11. The arrangement of claim 1 further comprising means for returning directly from the second child menu screen to the first child menu screen upon abandoning the specific tasks performable at the second child menu screen.

12. A method for displaying screens of information messages in a display device at a telephone terminal, the method comprising to steps of:

generating a plurality of screens of information messages arranged within a menu hierarchy, the information messages including multiple parent level and multiple child level information messages for displaying in associated parent and child menu screens;

advancing directly over a predetermined path from a displayed first child menu screen to an unrelated second child menu screen in the menu hierarchy for performing specific tasks at the second child menu screen; and displaying in the unrelated second child menu screen an information message, said information message including information provided by said first child menu screen for performing said specific tasks.

13. The method of claim 12 wherein the second child menu screen is located at the same level in the menu hierarchy as the first child menu screen.

14. The method of claim 12 wherein the second child menu screen is located at a level in the menu hierarchy lower than the first child menu screen.

15. The method of claim 12 wherein the second child menu screen is located at a level in the menu hierarchy higher than the first child menu screen.

16. The method of claim 12 further comprising the step of returning directly from the second child menu screen to the first child menu screen upon completion of the specific tasks performed at the second child menu screen.

17. The method of claim 12 further comprising the step of returning directly from the second child menu screen to a parent of the first child menu screen upon completion of the specific tasks performed at the second child menu screen.

18. The method of claim 16 wherein the second child menu screen is located at the same level in the menu hierarchy as the first child menu screen.

19. The method of claim 18 wherein the second child menu screen is located at a level in the menu hierarchy lower than the first child menu screen.

20. The method of claim 19 wherein the second child menu screen is located at a level in the menu hierarchy higher than the first child menu screen.

21. The method of claim 16 wherein the information messages being displayed in parent and child menu screens define the specific tasks that are performed at said menu screens.

22. The method of claim 12 further comprising the step of returning directly from the second child menu screen to the first child menu screen upon abandoning the specific tasks performable at the second child menu screen.

* * * * *